United States Patent
Rosin et al.

(10) Patent No.: US 6,397,387 B1
(45) Date of Patent: *May 28, 2002

(54) CLIENT AND SERVER SYSTEM

(75) Inventors: Robert Rosin, Franklin Lakes, NJ (US); P. Robert Hsu, San Jose; Yumie Sonoda, Los Altos, both of CA (US); Makoto Niijima, Saitama (JP); Hiroaki Nakano, San Francisco, CA (US)

(73) Assignees: Sony Corporation (JP); Sony Electronics, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 08/867,266

(22) Filed: Jun. 2, 1997

(51) Int. Cl.[7] .............................. H04N 7/10; H04N 7/14

(52) U.S. Cl. ............................ 725/44; 345/123; 725/52

(58) Field of Search ........................... 345/7, 114, 125, 345/327; 709/217; 725/37–60

(56) References Cited

U.S. PATENT DOCUMENTS

| | | | |
|---|---|---|---|
| 4,951,144 A | * 8/1990 | Des Jardins | ................. 358/182 |
| 5,410,344 A | 4/1995 | Graves et al. | |
| 5,485,197 A | 1/1996 | Hoarty | ........................... 348/7 |
| 5,512,954 A | 4/1996 | Shintani | |
| 5,524,195 A | 6/1996 | Clanton, III et al. | |
| 5,543,818 A | 8/1996 | Scott | |
| 5,585,865 A | 12/1996 | Amano et al. | |
| 5,657,072 A | * 8/1997 | Aristides et al. | ............... 348/13 |

(List continued on next page.)

FOREIGN PATENT DOCUMENTS

| | | | |
|---|---|---|---|
| EP | 0 626 635 A2 | 11/1994 | |
| WO | WO 97/13368 | 4/1997 | |
| WO | WO 97/33434 | * 9/1997 | ............ H04N/7/00 |

OTHER PUBLICATIONS

Nygren K, Johnsson I–M, Carlvik O: "An Agent System for Media on Demand Services" PAAM 96, Processing of the First International Conference on Practical Application of Intelligent Agents and Multi–Agent Technolgy, Apr. 22–24, 1996, pp. 437–454.

(List continued on next page.)

*Primary Examiner*—Andrew Faile
*Assistant Examiner*—Reuben M. Brown
(74) *Attorney, Agent, or Firm*—Fulwider Patton Lee & Utecht, LLP

(57) ABSTRACT

An internet on-demand system for television presents internet content and traditional television programming as part of a single coherent interface. The system includes a server and a client capable of providing a dynamic graphical user interface. The system can display an internet gateway interface which actively scrolls through and highlights links to selected web pages which are organized according to templates corresponding to their content. The web pages are presented on the graphical user interface as channels as part of the same milieu as channels of traditional television programming. The user can select a channel from a rotary menu wheel or via channel-up, channel-down buttons on the remote control device. An intelligent agent passively filters selected web pages for a user to explore based on the user's past pattern of usage of the client. The server queries the client regarding its available data stream connections, including telephone modems, cable modems, wireless telecommunications and digital satellite broadcasting, regarding its ability to detect embedded data in TV signals, in order to determine the most efficient delivery of different types of data through all of the available bandwidth connections for both directions of data flow. The efficient delivery of data allows the client to present text, graphics, video, audio and other multimedia information from a web page over the internet as a coordinated presentation.

2 Claims, 10 Drawing Sheets

U.S. PATENT DOCUMENTS

| | | | | |
|---|---|---|---|---|
| 5,727,129 | A | * 3/1998 | Barrett et al. | 395/12 |
| 5,786,864 | A | * 7/1998 | Yamamoto | 348/473 |
| 5,828,420 | A | * 10/1998 | Marshall et al. | 348/564 |
| 5,848,396 | A | * 12/1998 | Grace | 705/10 |
| 5,850,218 | A | * 12/1998 | LaJoie et al. | 345/327 |
| 5,940,073 | A | * 8/1999 | Klosterman et al. | 345/327 |
| 5,961,602 | A | * 10/1999 | Thompson et al. | 709/229 |
| 6,002,394 | A | * 12/1999 | Schein et al. | 348/13 |
| 6,005,565 | A | * 12/1999 | Legall et al. | 345/327 |
| 6,005,601 | A | * 12/1999 | Ohkura et al. | 348/7 |
| 6,016,307 | A | * 1/2000 | Kaplan et al. | 370/238 |
| 6,020,881 | A | * 2/2000 | Naughton et al. | 345/327 |
| 6,160,552 | A | * 12/2000 | Wilsher et al. | 345/339 |

OTHER PUBLICATIONS

Chen H et al.: "Internet Categorization and Search: A Self–Organizing Approach" Journal of Visual Communication and Image Representation, vol. 7, No. 1, Mar. 1996, pp. 88–102.

"WEB TV Networks Chooses Spyglass' Surfwatch Parental Controls" Available from Internet, Jul. 10, 1996.

Quintana Y: "Knowledge–Based Information Filtering of Financial Information" Proceedings of the National Online Meeting, May 13, 1997, pp. 279–285.

Wittig H et al.: "Intelligent Media Agents in Interactive Television Systems" proceedings of the international conference on multimedia computing and systems, May 15, 1995, pp. 182–189.

"Verknuepfung Von TV Mit Internet" Funkschau, vol. 68, No. 18, Aug. 16, 1996, pp. 70–71.

Net Perceptions, Product Info. White Paper, Building Customer Loyalty and High–Yield Relationships Through GroupLens™ Collaborative Filtering (Mar. 1997).

AUS WEB 97, Technical, Agent Technology in Electronic Commerce and Information Retrieval on the Internet (Nov. 5, 1996).

Henry Lieberman, Autonomous Interface Agents Proceedings of the International Join Conf. on Artificial Intelligence Material (Aug. 1995).

Kai R. Larsen, Finding Information on the World Wide Web (Dec. 1995).

Henry Lieberman, Letizia: An Abent That Assists Web Browsing Proceedings of the ACM Conference on Computers and Human Interface, CHI–97, Atlanta, GA (Mar. 1997).

Paul Resnick, et al., GroupLens: An Open Architecture for Collaborative Filtering of Netnews, from Proceedings of ACM 1994 Conference on Computer Supported Cooperative Work, Chapel Hill, NC, 175–186 (1994).

* cited by examiner

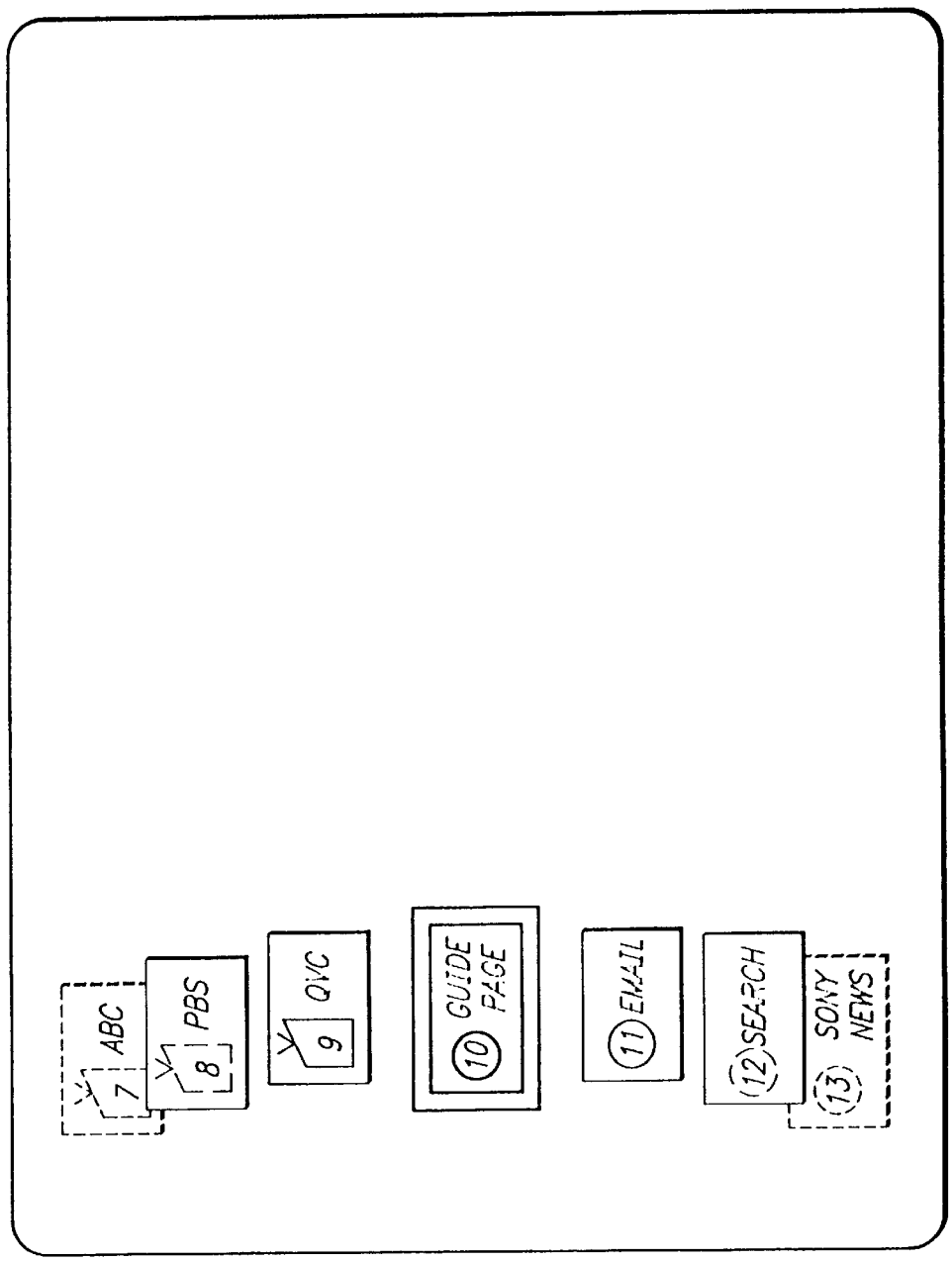

CLIENT AND SERVER SYSTEM

BACKGROUND OF THE INVENTION

The present invention relates generally to a client and server system for presenting multimedia information and, more particularly, to an integrated internet on-demand system for television.

The internet is a collection of networks, including those maintained by commercial backbone providers such as MCI, PSINet, UUNET, and Sprint. The term "internet" applies to this entire set of interconnecting networks. Domain names, such as uspto.gov, are unique internet server addresses which function as the cyberspace addresses for organizations connected to the internet.

Interest in the internet has been increasing recently, especially in regard to e-mail and what has become known as the World Wide Web, which allows information on the internet to be presented through a graphical interface. The World Wide Web is a major client-server system, with millions of users, and is essentially a vast collection of interconnected documents.

Typically, on the internet, a larger computer is a server and a smaller computer is a client. A client can be a personal computer which is associated with the user. The client computer is connected to the internet via a modem connection, typically to a server at a point-of-presence (POP), the location of an access point to the internet. A client can use any of the servers, and often uses a series of them. The primary purpose of a server is to deliver a document on request to a client. The document may be text, an image file, or other type of file. The document is identified by a name called a Uniform Resource Locator ("URL") which typically includes the domain name of an organization. If the server is storing that particular URL, then the server delivers the document at that URL to the client in response.

Browsing software (i.e., web browsers) allow client users to request and display text and graphics, typically from a Hyper Text Markup Language ("html") document or web page identified by a URL on a web site server. When accessing web pages over the internet, a client user may reference an html document containing hypertext links to other documents, which may have URL addresses to different servers. When a link is selected, the browser is expected to fetch the new document and display it in place of the current one. In this manner, information from different internet servers can be linked together through documents containing such links. These links may be organized according to topics so that the links grouped under a particular topic relate to addresses for web pages which deal with related subject matter. For example, the U.S. House of Representatives' web server hosts html documents at URL address http://law.house.gov which contain links to a variety of other web pages generally relating to legal issues, including patent law. However, these links are presented to the user in a static manner, often with little guiding information.

Requesting web pages from servers using a client browser is commonly referred to colloquially as surfing the web. Although the use of animation, as well as audio and video, is becoming more common, the majority of web sites generally only present static graphical images. Even with data compression techniques, graphical files are notoriously large and slow to download given the limited bandwidth available over existing telephone modem connections. A web page having a large number of graphical images can take several minutes to retrieve. Audio and video files are typically very large, and can take even longer to completely download. This can result in long and frequent delays in retrieving and using such files.

However, the typical television viewer is accustomed to a near immediate response when selecting a channel or television station to watch. Although off-line browsing allows a client user to view pages already stored in cache memory from previously visited web sites, these documents are often not meaningfully organized, such as by topical subject matter for easy assimilation by the client user. Nor do these cached pages necessarily represent the most recent version of the pages available from the web site of interest.

Along with the increasing interest in the internet and the world wide web, appliances or set-top boxes similar to cable TV boxes have been developed in an attempt to allow access to the internet through the traditional television set. However, such attempts suffer from delays in accessing the graphics of the web, and the lack of experience in the mass-market with regard to the internet, especially in regard to finding and accessing relevant web pages of interest. Mass-market consumers are typically accustomed to having information broadcasted or delivered to them with minimal effort or delay.

The practice or technology of having information brought to a client user by an agent is sometimes referred to as push. Pushed information appears to have been initiated by the server rather than by the client or the user. However, in current systems, the information pushed from a server to a user often comes as the result of a programmed request from the client in the user's computer. Information pushers often require that the client download a program which often determines the useful data desired by the user and then occasionally initiates requests for information from the server. However, users may find such questionnaires to be burdensome, and may not completely and accurately complete the questionnaire.

Hence, there has been a long existing need for a system which is capable of navigating the internet efficiently so as to provide text, images, sound, and video on-demand in a simple, intuitive manner akin to traditional television programming for mass-market consumers. The present invention fulfills these needs.

SUMMARY OF THE INVENTION

Briefly, and in general terms, the present invention provides an internet on-demand system for television presenting internet content and traditional television programming as part of a single coherent interface.

The system selectively displays internet content and television programming. The system comprises a client including a display. The system further comprises means for selecting between channels separately representing individual television content and individual internet content. When an individual television content channel or an individual internet content channel is selected, the client presents the content associated with the selected channel on the display. Means for displaying an internet gateway interface selectively scrolls through links to selected web pages organized according to templates corresponding to web page content displayed on internet content channels. The server includes means for establishing a data connection with the client and downloading data along the data connection to the client.

One aspect of the present invention is that the system provides a user interface for efficiently navigating among different information sources in a simple, intuitive manner.

Another aspect of the present invention is that the system can display an internet gateway interface which actively scrolls through and-highlights links to selected web pages.

A further aspect of the present invention is that the system can present an internet gateway, web pages, and traditional television programming as part of a single coherent interface.

Still another aspect of the present invention is that the system provides a dynamic interface organized into categories of information in a coordinated and coherent manner.

One aspect of the present invention is that the system can display a rotary menu on the screen to present both internet links and traditional television programming as channels for selection by the user.

Yet another aspect of the present invention is that the system can use an intelligent agent to passively filter selected web sites or content for a user to explore based on the past pattern of usage of the client by the user.

Another aspect of the present invention is that the system can categorize the selected web content into topics contained in a template based on attributes identifying the subject of the web pages, and present links to those web pages in a graphical interface based on the template to the user.

Another aspect of the present invention is that the server queries the client regarding its available data stream connections in order to determine the most efficient delivery of different types of data through all of the available connections.

An additional aspect of the invention is that the system can coordinate the data stream to the client across different data connections in order to maximize the available bandwidth capacities to provide a more coordinated and faster internet experience when presenting text, graphics, video and audio information from a web page.

Another aspect of the invention is that the system uses both background delivery of internet content, and coordinated data streaming across different data connections.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 8 illustrates a rotary menu wheel for a graphical user interface in accordance with the present invention;

DETAILED DESCRIPTION

Figure 1:
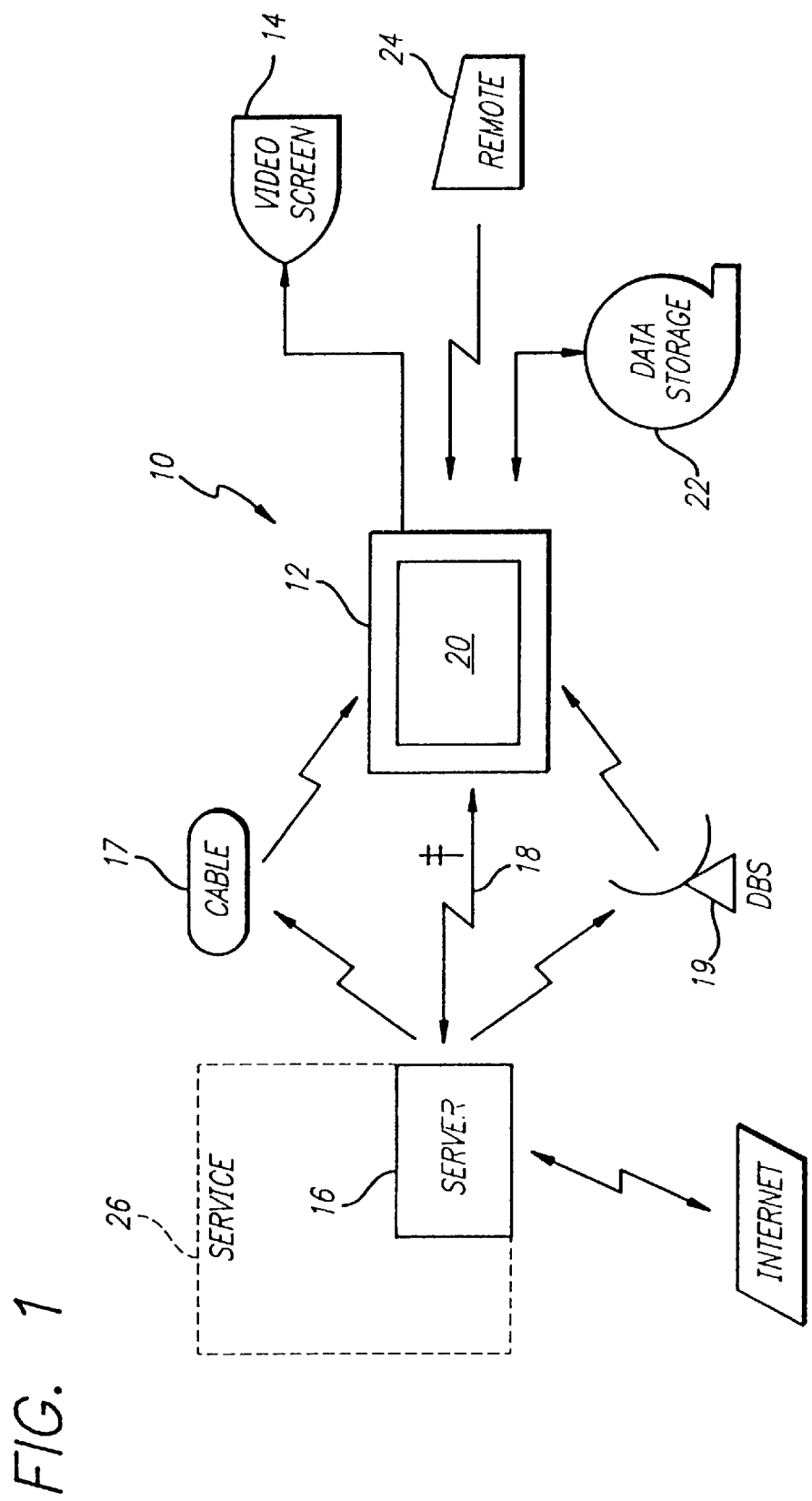
FIG. 1 is a block diagram illustrating a client-server system in accordance with the present invention.

Referring now to the drawings, and in particular to FIG. 1, there is shown a client-server system for presenting multimedia internet content and broadcast data and television programming on a television screen. The client 10 includes a set-top box 12 which is connected to or integrated within a television appliance 14. The set-top box 12 provides connections to video and computer data sources which are processed and displayed on the screen of the television appliance 14. The television appliance can include a cathode ray tube ("CRT"), liquid crystal display ("LCD"), or other device capable of presenting a video image. The client is preferably connected to the server 16 by a telephone modem 18.

The client further includes a processor 20 capable of performing multimedia tasks, programming for internet web browsing and controlling multimedia tasks, a digital data storage medium 22 such as a hard drive, digital video disk ("DVD") or digital video tape ("DVT"), and a remote control device 24 to allow the user convenient control of both internet and television functions through the set-top box. The remote control device 24 preferably includes numeric keys, channel-up (forward) and channel-down (back) buttons for selecting channels, directional controls for controlling movement, such as a cursor or menu selector, on the television screen, a button for activating a link or command, and dedicated keys for jumping to a home page or other specialized function. Alphanumeric or other text may be input using the remote control device or a separate keyboard. A method and apparatus for entering text using an input device having a small number of keys is disclosed in U.S. Pat. No. 5,543,818 ("Scott"), and is hereby incorporated by reference.

The video connections to the client 10 can include cable 17 and digital broadcasting satellite ("DBS") 19. The video connections may be made to peripherals such as a VCR which would be connected to the set-top box. The computer data connections to the client can include telephone modems and ISDN connections, as well as digital satellite data services, and cable modems over the video connections to the client. It should be noted that the client can utilize several different types of data connections simultaneously. Computer data information may be multiplexed or otherwise embedded in a video signal source. A television receiver with a decoder for decoding coded data from a video signal is disclosed in U.S. Pat. No. 5,512,954 ("Shintani"), which is hereby incorporated by reference. Both television and computer data can be provided to the client over the same digital satellite connection. For example, the client can utilize both a telephone modem and a digital satellite service, where the satellite service delivers to the client both traditional television programming, as well as internet content during the blanking signal of the television programming.

Figure 2:
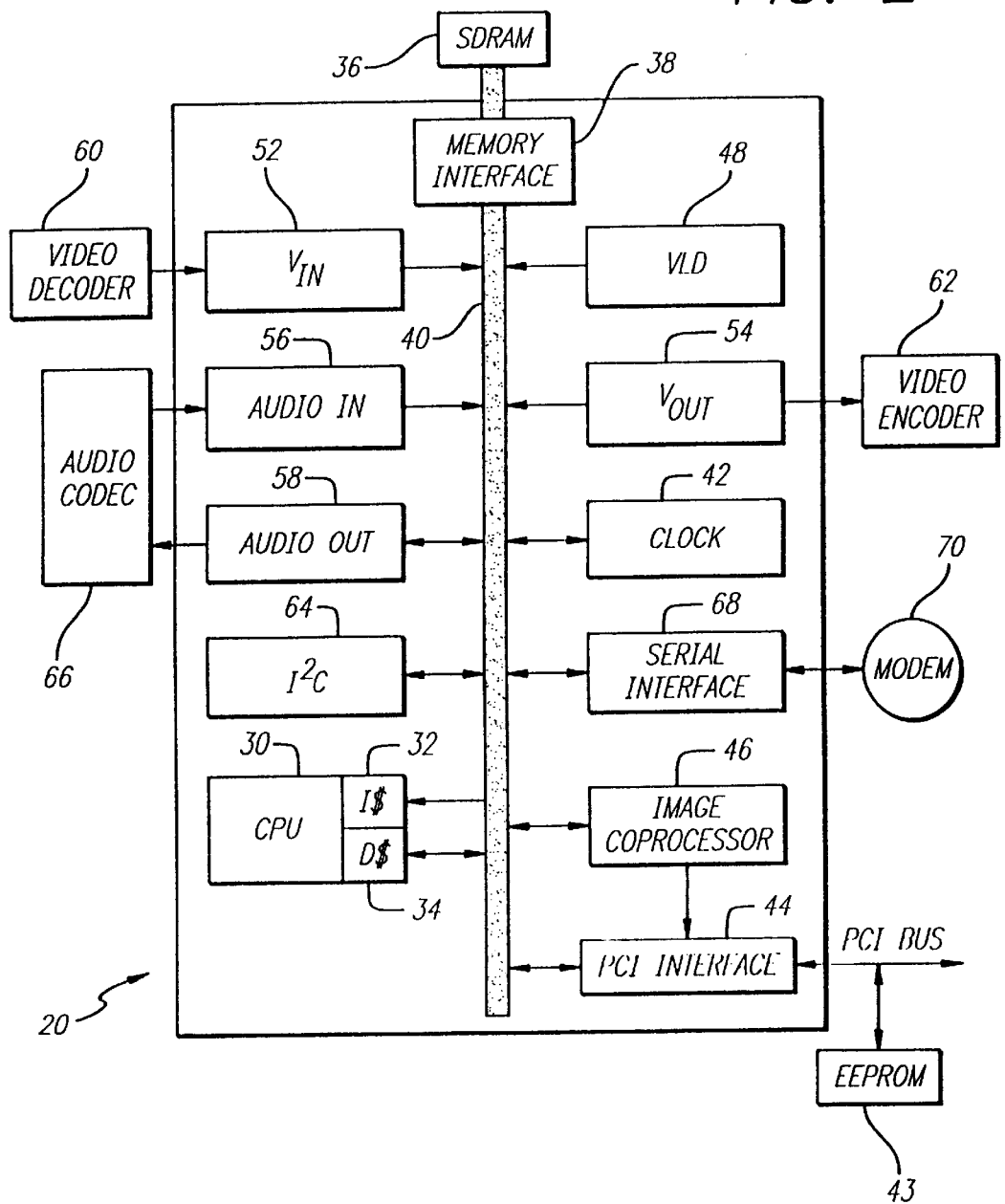
FIG. 2 is a block diagram illustrating the client of the client-server system in accordance with the present invention.

The processor 20 of the client is a multimedia processor which preferably includes a very long instruction word (VLIW) architecture. A suitable processor is known by the tradename "TM-1" which is manufactured by Philips Semiconductors—TriMedia Product Group, Sunnyvale, Calif. A block diagram of the processor 20 of the client 10 is illustrated in FIG. 2 by way of example. The processor includes a CPU 30 having an instruction cache 32, a data cache 34, and VLIW architecture which can run a real-time operating system (RTOS) kernel. To save bandwidth and storage space, the VLIW instructions can be compressed until needed. The processor includes an application library which can provide routines to establish a data connection with a server over a modem, enable web browsing, retrieve e-mail, encode and decode video data compressed using the MPEG1 standard, and decode MPEG2 files.

Synchronous DRAM (SDRAM) 36 is available through the memory interface 38 and data 43 containing a boot program for the processor can be connected to the processor through a PCI interface 44 to enable standalone operation of the processor.

A number of dedicated coprocessors are connected to the CPU through the data bus. An image coprocessor 46 is available to copy images from the SDRAM to a video frame buffer and perform scaling and color space conversions. A transfer rate of 50 megapixels per second (Mpix/Sec.) can be maintained by the image coprocessor. A variable-length decoder (VLD) coprocessor 48 is available to assist in decompressing MPEG1 and MPEG2 data streams.

Direct memory access (DMA) driven multimedia input/output (I/O) units which operate independently to process data are connected to the CPU 30. The video input unit 52, video output unit 54, audio input unit 56, and audio output unit 58 are DMA-driven I/O units. The video input unit 52 can accept video data from a video decoder 60 which converts a composite Y/C video signal into YUV 4:2:2 digital video data. The video output unit can provide data in YUV 4:2:2 video output format to a digital video encoder 62. Both the video input and video output units can follow the CCIR656 format. For example, the video output unit can drive other CCIR656-compatible devices such as a digital video tape recorder. An I²C interface 64 can also be included. An audio code unit 66 having a 16-bit ADC and a 16-bit DAC for audio coding and decoding operations can be connected to the audio input and audio output units.

A synchronous serial interface 68 can be connected to a modem 70 for communicating with the server. The modem can be a V.34 modem capable of achieving a connection speed of 33.6 Kbps or greater over a standard telephone line or an ISDN modem interface. External circuitry to interface with incoming multimedia data streams can be connected to the processor as needed.

The server 16 is a computer with which the client preferably can establish a connection with over a telephone modem. The server functions as the client's access to the internet so that the client can request documents, files and other information from other servers connected to the internet. For purposes of discussion, this server, which is part of an on-line service 26 for the user, will also be referred to as the POP or network server. The service provider can package content to address the information needs and interests of a diverse consumer marketplace. Updates to the operating and applications software used by the processor of the client can be provided by the server as needed.

The server 16 can also provide a page with links or shortcuts to internet content to be displayed in the graphical user interface ("GUI") or front-end of the client. These pages are displayed as part of a selection of channels for both internet content and television programming. The links provided by the server are to web pages which preferably have already been screened by the internet service provider for quality and suitability. The links are classified into categories or topics within templates which can be stored on the server, the client, or both, to provide a framework for presenting these links through the interface of the client.

Figure 3:
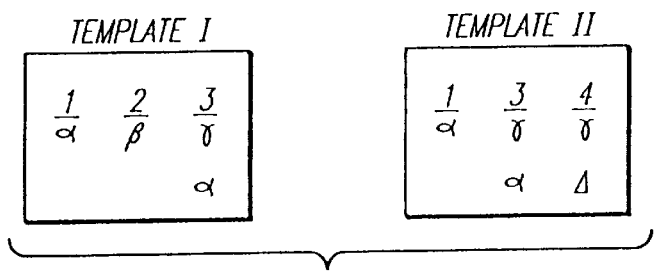
FIG. 3 illustrates templates for categorizing web pages or links to web pages in accordance with the present invention.

The templates can be stored either on the client or the sever, depending on the available storage space on the client. The templates can contain several different categories or topics from a given universe of topics. The same category or topic may be found in different overlapping templates. As illustrated in FIG. 3, template I and template II are separate templates in which topics 1 and 3 overlap. The topics associated with a template may be initially predetermined, and later adapted over time based on the past viewing and browsing interests of the user.

The subject matter of the topics or categories are defined by predefined identifying attributes so that each category can be defined by one or more of these attributes. These attributes can be associated with web pages in order to identify aspects of the subject matter or content of the page. As illustrated in FIG. 3, topic 1 is defined by the attribute $\alpha$, topic 2 is defined by the attribute $\beta$, topic 3 is defined by the attributes $\gamma$ and $\alpha$, and topic 4 is defined by $\gamma$ and $\Delta$. As an example, attribute $\alpha$ may identify the subject of "sports," attribute $\beta$ as "news," attribute $\gamma$ as "films," and attribute $\Delta$ as "science fiction." Topic 1 would then include web pages having the attribute $\alpha$ for sports attached linked to web pages relating to films concerning sports would include both the sports attribute $\alpha$ and the films attribute $\gamma$ and would be sorted or categorized as part of topic 3. Similarly, template I would include topics pertaining to sports, news, and sports films, while template II would include topics pertaining to news, sports films, and science fiction films, as defined by the relevant attributes.

Figure 4:
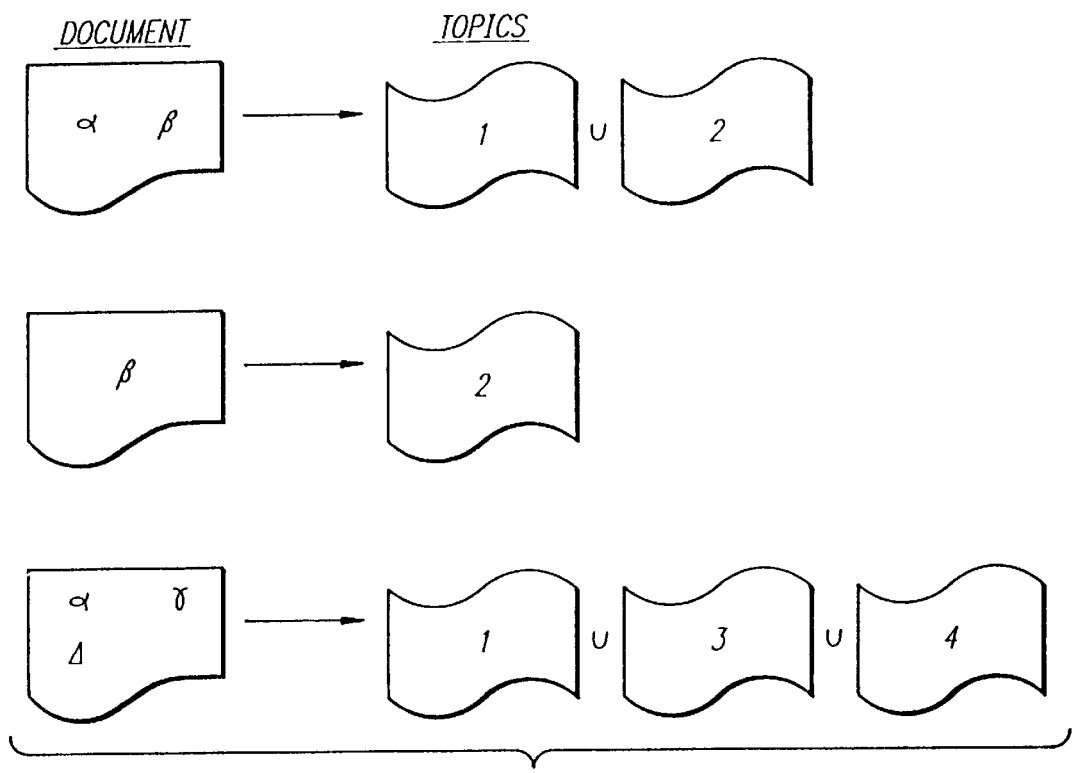
FIG. 4 illustrates documents being sorted into topics from the templates in accordance with the claimed invention.

The content of web pages may be described by one or more identifying attributes, and accordingly filtered into the categories or topics of the selected template. As illustrated in FIG. 4, a document having associated attributes $\alpha$ and $\beta$ would be put in topics 1 and 2, while a document having only attribute $\beta$ associated therewith would only be classed as part of topic 2. As an example, a web page discussing "Rollerball," a science fiction film with a sports theme, would be classed as part of topics 1, 3 and 4 in both templates I and II. Prescreened web pages having been given identifying attributes can be classified according to those attributes and forced into the topics for the templates.

While the template and its associated topics may be predetermined, they can be later adapted automatically by an intelligent agent on either the client or the server based on the past viewing and browsing habits of the user. The client or server can record the attributes given for the web pages, and based on these recorded attributes, an algorithm may be used to modify the topics by adding attributes or altering the relationship of the attributes to one another using boolean ("AND, OR, NOT") logic. As an example, topic 1 of template I could be modified to exclude the science fiction attribute $\Delta$ so that the Rollerball web page would not be present in topic 1 of template I. Based on the recorded attributes, new topics can be generated for the templates, or a new template can be generated altogether.

The templates can be part of specific gateway interfaces tailored for specific user profiles. For example, the user may initially be required to select a general, preferably demographically-based, profile which may provide preselected web links in a predetermined set of categories. The particular graphical interface in which these links are presented to the user can also be selected based upon the experience level and the amount of interactivity desired by the user, which may also be automatically modified over time by an agent to fit the experience level of the user.

The templates are preferably used in an active and dynamic interface on the television screen to the user. This may be referred to as active frame scrolling. The template may form part of a guide page with links to different preselected and precategorized web pages of interest. The guide page may include html codes, and may be a front-end window separate from the browser. The guide page may be represented as a channel from a menu of channels to be selected by the user in addition to traditional television programming channels. As previously discussed in connection with the templates, the guide page may be automatically modified, adapted, and updated by either the client or the server, and be based at least in part on past viewing and browsing habits of the user.

The guide page may reside on the client, the server, or a combination of both. For example, the guide page may reside on the client, and be periodically updated by the server; or the template for the guide page may reside on the client while the content for the page is located on the POP server or another server identified by links in the guide page.

The guide page can include a set of topics, and a set of links associated with each topic. The links preferably include an associated object such as a graphic image to visually indicate the subject matter of the link. The guide page provides a dynamic interface in that it scrolls through the links in order to provide the client user with a revolving choice of links. The guide page further includes the objects associated with the scrolling links which may be displayed as a sideshow presentation to the user. Alternatively, the interface can present the guide page with the objects associated with the scrolling links as a filmstrip presentation to the user.

Figure 5:
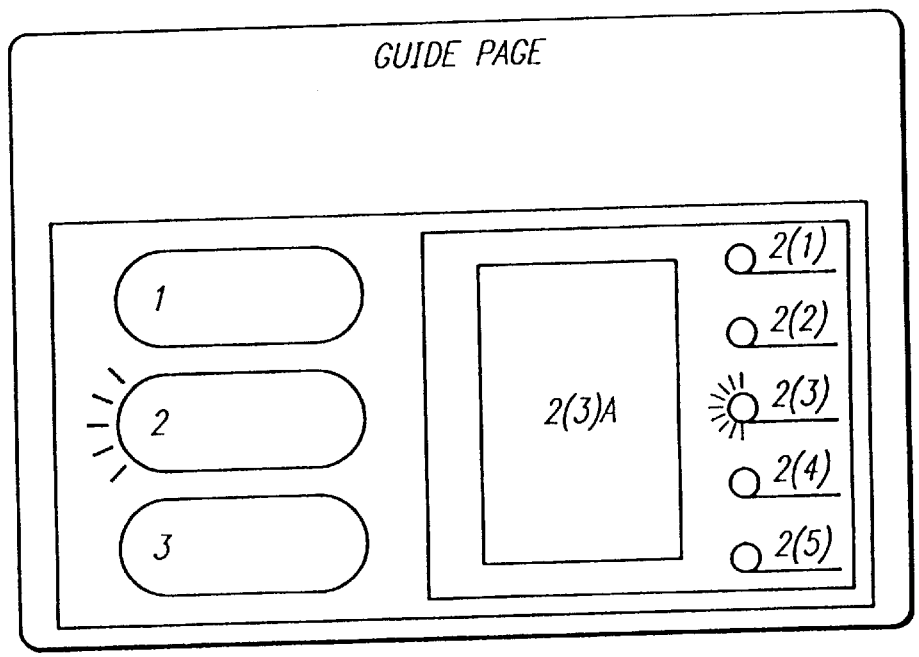
FIG. 5 illustrates an active frame for a graphical user interface in accordance with the present invention.
Figure 6:
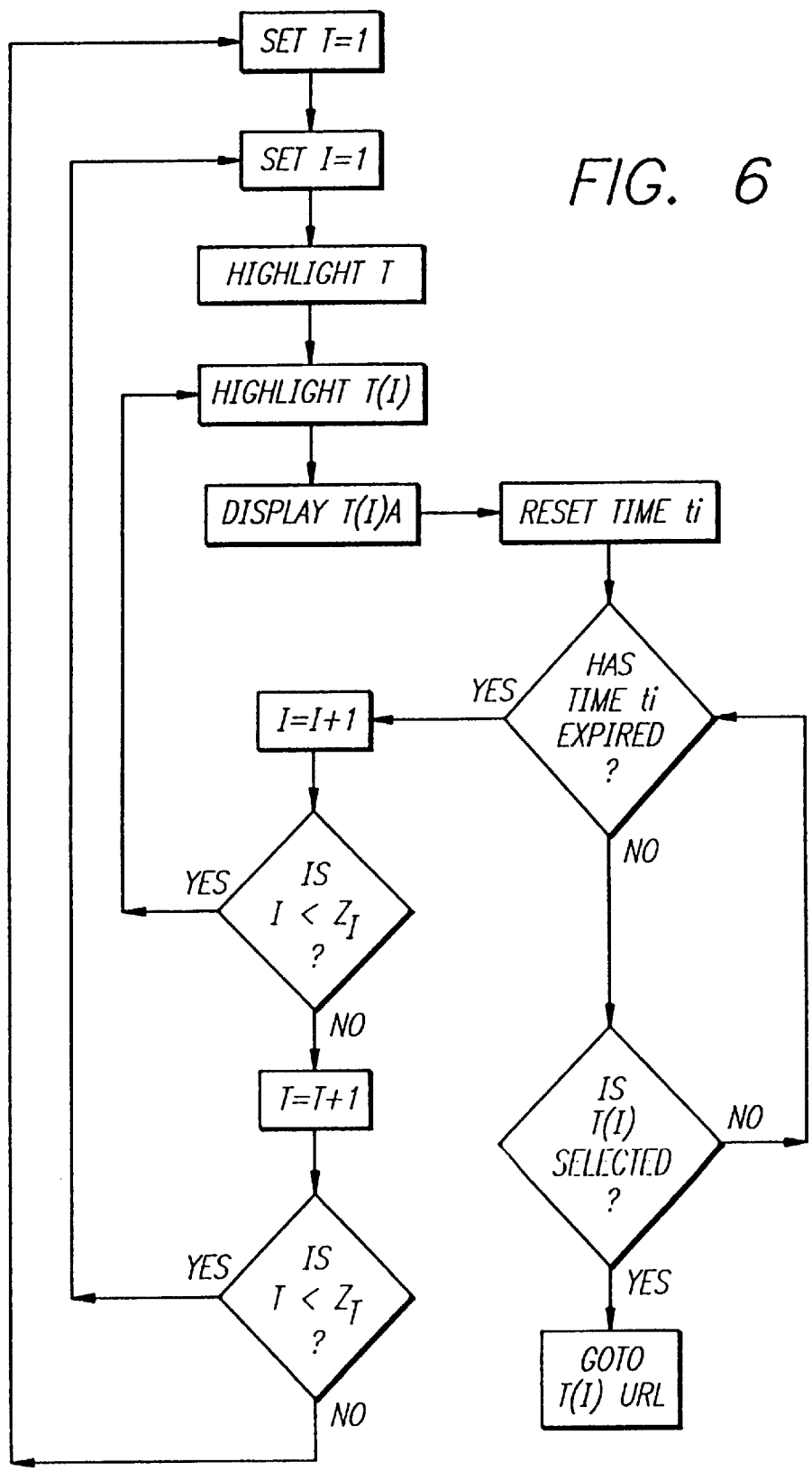
FIG. 6 is a flow chart illustrating the active frame for a graphical user interface in accordance with the present invention.

The selections of topics and links can be viewed as a series of sequences. For example, a first set of selected topics are displayed on the screen for the client user. One or a plurality of topics in a subset of the first set of topics is selectively highlighted in a first sequential order. For example, as illustrated in FIGS. 5 and 6, each succeeding displayed topic would be highlighted in descending order, and then the sequence would begin again at the top of the column of topics.

A second set of internet links associated with the highlighted topic are displayed while the first set of topics are being displayed. Each link preferably references a URL for a web document. The internet links of the second set are highlighted in a second sequential order. For example, as shown in FIG. 5, the highlighting of links would follow a descending order similar to that for the set of selected topics. When the second sequence of highlighting the links is completed, the next topic and then highlighted, and the links associated with the subject matter of that topic are highlighted in sequence. The next topic in the first sequential order is not highlighted until after the last link in the second sequential order is highlighted. Alternately, the next topic is not highlighted until a preselected period of time passes, or until the user indicates that the system should proceed to the next topic, in order to allow the user adequate time to select a desired link.

The dynamic revolving sequence of displaying graphics and sounds associated with particular highlighted links which are part of a set of links associated with a particular topic can be thought of as a series of nested loops. FIG. 6 is a flow chart generally illustrating the active frame scrolling which dynamically presents the topics, links, and associated descriptive objects according to a classification structure defined by a template. Where T represents the topic, and I an internet link connected with a particular URL, both are initially set to a value of one. If topic T and associated internet link T(I) are highlighted, associated object T(I)A is displayed on the interface as well. Next, while waiting for a predetermined amount of time $t_i$ to expire, the client may accept the user's selection of associated link T(I) and retrieve the web page at the URL connected with that link. If time $t_i$ expires and there has been no selection by the user, then values T and I are incremented by one. First, internet link I is incremented and that next link can be highlighted, unless the value of I is greater than the number $Z_I$ of links associated with that topic T. In the latter situation, T is then incremented by one and that next topic is highlighted along with its associated links. If T is greater than the number $Z_T$ of topics for that template, then T is set back to one, and the scrolling sequence is started at the beginning. The order of these topics can of course be modified by the user at any time.

The user can select the highlighted link by depressing a selection or enter button on the remote control device while that link is highlighted. Alternately, the user can use the remote control to manipulate a cursor to select a link or topic which is not highlighted. When the highlighted link is selected by the user, the internet content, such as the page or document at the URL of the highlighted link, is delivered to the client and displayed on the television screen.

While a link is highlighted, an object, such as a graphic image, animation, sound file, or a combination thereof, associated with the highlighted link is displayed on the television screen. By scrolling through the selected topics of the first set, the links of the second set associated with each selected topic, and the objects associated with each link, as each are highlighted, a dynamic interface is presented to the client user.

For example, as illustrated in FIG. 5, topic "2" is highlighted, and the associated links 2(1), 2(2), 2(3), etc., are displayed in association with highlighted topic 2 for a predetermined amount of time. These links in turn are highlighted in sequence, and the object 2(3)A associated with highlighted link 2(3) is displayed in the interface for a short period of time.

Figure 7:
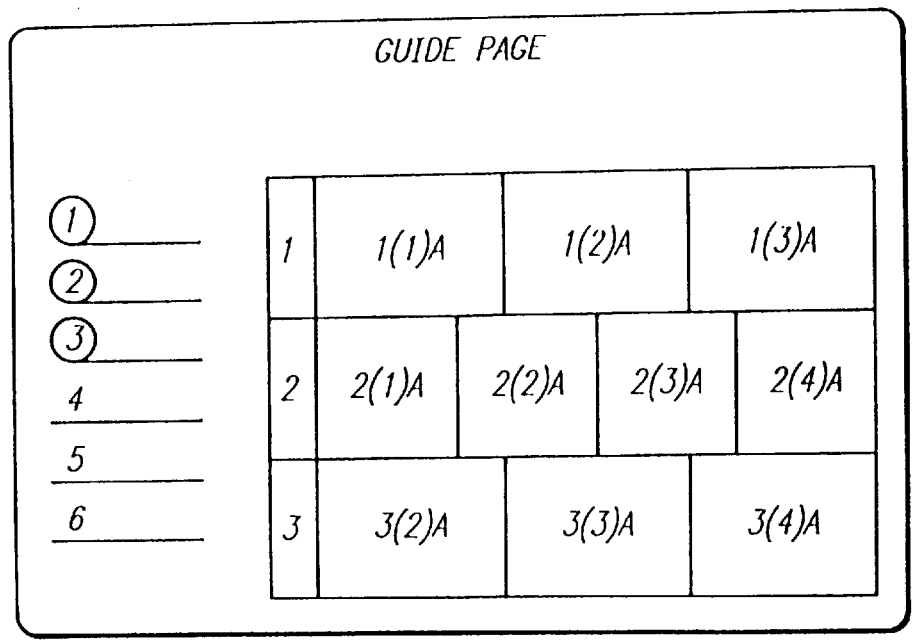
FIG. 7 illustrates another embodiment of the active frame for a graphical user interface in accordance with the present invention.

Alternately, as illustrated in FIG. 7, the interface can present the guide page with the objects associated with the links scrolling from right to left as a filmstrip presentation to the user. The associated links and objects for several topics and several links can be shown simultaneously. The links and associated objects are displayed to the user as a dynamic sideways moving slideshow. After pausing for a predetermined amount of time, one or more objects are moved out the frame at a time. Another set of topics and associated links and objects can be displayed in the interface after each of the previously displayed links has been shown in sequence. The associated objects can be displayed and scrolled in a horizontal sideways presentation, or in a vertically moving presentation.

The interface preferably displays the associated object while the second set of links are also being displayed. The object may be stored on the client, the POP server, or on the server containing the URL for the highlighted link. For example, the associated object may be downloaded from the server when the link is first highlighted, preferably over a high speed, large bandwidth data connection such as a digital satellite or cable modem connection. Alternatively, the associated objects or graphics may be downloaded periodically to the client and saved on the digital storage medium during off-peak hours in the early morning hours when usage is low in order to provide a fast dynamic interface to the user. Furthermore, the time required to establish a dial-up connection to the POP server can be reduced so as to be transparent to the user by initiating the connection when the user initially selects the guide page from a menu of channels. Documents or web pages which are part of frequently visited web sites can also be automatically updated and downloaded during off-peak hours in order to allow for fast off-line browsing. After a link is selected by the user, and while the previously downloaded and stored web page is being viewed by the user, the client can establish a connection with the POP server to follow any links present in the web page and download other related or linked web pages which the user may predictably find of interest.

The user may desire to switch quickly between internet content and television programming. An overlying menu of channels may be activated at any time on the screen to provide a single uniform interface to navigate among internet sites and television stations. Although television stations have traditionally presented as local channels, internet address have generally not been represented as such. The web channels would be different from television channels in that web channels would represent a location or URL on a particular server. A guide page having links to URLs or shortcuts to such links can also be a separate channel on the overlying menu, preferably is in the form of a rotary wheel menu.

As shown in FIG. 8, television stations and internet web pages can be presented as distinct channels on a single rotary wheel menu 80: The rotary wheel menu overlies the screen and allows the video or television programming to continue playing in the background, such as in the part of the display screen which is not occupied by the menu. This also applies to where the background is a web page so that animation and streaming video can continue to be updated. The user can directly select the next channel, whether internet or television based, to be visited using the menu. The client can continuously poll its I/O interface with the remote control device to detect user input or commands.

The rotary wheel menu 80 is presented as a series of panels 82 which appear to occupy a three dimensional space extending behind the television screen. The panels 82 on the front side of the rotary menu wheel 80 can be viewed on the television screen. The rotary menu wheel can include any number of panels, and displays a number of panels, such as five, seven or nine, which can remain legible on the front side of the menu wheel on the television screen. The remaining channels would not be displayed when rotated out of view to the back side of the wheel. Although the menu is described as a wheel for simplicity, the abstract geometric configuration of the menu need not be spherical. Although only a small fraction of the available number of panels may be visible in the interface at any one time, the menu wheel displayed can still simulate movement within a three-dimensional space when being rotated by causing the visible panels at the extreme top and bottom of the display screen appear faded and occupy a space behind another panel as the wheel is rotated.

The panels can include text and graphics to describe and symbolize channels for particular television stations, internet web pages, and e-mail. Channels are selected by rotating the wheel in order to move the desired panel into a highlighting selection box 84. The simulated wheel can be rotated to move the panels up and down by manipulating the remote control device, such as by depressing an "up channel" or "down channel" on the remote control device. An enter or select button on the remote control device can be used to select the desired channel highlighted in the selection box. The user can also view the channels immediately adjacent to the channel highlighted in the selection box.

The rotary menu wheel 80 resembles a Ferris wheel in certain respects in that the panels 82 remain facing the user even as the simulated wheel is being rotated. The text in the panels of the front half of the wheel facing the user maintains its dimensions and remains legible, even as the panels are rotated into different positions. The panels and accompanying text at the extreme top and bottom of the wheel begin to fade in order to further depict a three dimensional space occupied by the wheel. This is illustrated in FIG. 8 by the dashed lines for the panels at the upper and lower extremes of the rotary wheel menu.

Each panel is displayed according to its position on the wheel. For example, the vertical coordinate for any one panel to be displayed on the television screen would be:

$$y^*\sin(t)+C_V,$$

where the vertical rotational radius y is set to 200, vertical coordinate constant $C_V$ is set to 250, and the angle t of that panel is relative to the center of the simulated wheel lying on the center horizontal axis of the screen. The values of y and $C_V$ are provided only to illustrate relative values which may be used to simulate vertical movement along a television screen. The above equation is applied when t is between $-\pi/2$ and $\pi/2$ radians so that $\cos(t)$ is positive, and defines the front face of the wheel which would be visible to the user. Where $\cos(t)$ is negative, that panel would occupy the back side of the wheel, and should not be visible. The highlighted selection box 84 should be located over the panel where t equals zero.

As the angular position of the panel approaches the zenith or the nadir of the wheel, the relative change in the vertical coordinates decreases as the sine curve levels off in approaching a value of one. The rate of vertical movement decreases so that the distance between adjacent panels decreases, and eventually overlap, towards the zenith and nadir of the simulated wheel. This causes the extreme panels displayed on the screen to appear to move behind the other displayed panels.

As the panel is moved to the zenith and nadir of the wheel, the panel becomes more transparent. This also has the effect of previewing more channels on the wheel than if the panel remained opaque. Using the equation, $100^*\cos(t)$, to define the transparency of the panel, it is apparent that $\cos(t)$ approaches zero to render the panel transparent as the panel approaches the respective zenith and nadir of the circle defined by the wheel. This further enhances the facade that the extreme panels displayed on the screen are behind the other displayed panels.

In order to provide a more dimensional feel to the wheel, some horizontal movement can be introduced in addition to the vertical movement so that the wheel appears to slightly trail off the screen as the panels approach either the apex or nadir of the visible screen. As before, the horizontal coordinate for the panel displayed would be:

$$x^*\cos(t)+C_H,$$

where the horizontal rotational radius x is set to 10, horizontal coordinate constant $C_H$ is set to 70, and t is the angle of the panel is relative to the center of the wheel and the center horizontal axis of the screen. The values of x and $C_H$ are provided only to illustrate relative values which may be used to simulate slight horizontal movement of a panel along a television screen as the panel is moved to the extreme top or bottom of the screen. The wheel is given an apparent curved quality by this slight horizontal movement of the panel as the panel moves vertically. As before, this equation applies only where cos(t) is positive. The highlighted selection box should be located over the panel where t equals zero, which should also represent the maximum horizontal coordinate for the panel. Again, where cos(t) is less than zero, the panel would be on the back side of the wheel, and should not be visible.

The user can edit the channel list for the menu wheel. The user can bookmark particular web pages or sites to appear as new channels in the menu wheel. Other channels may be added to the menu wheel for cable television channels, satellite channels, and other sources. Also, different menu wheels can be made available so that several different users can operate the system using different menu wheels with a personalized selection of channels.

The channels can be organized as a circular queue and any suitable data structure is used to keep track of the channels in the queue. The queue is initially preloaded with channels, and any arbitrary channel can be set to correspond to the channel which is to be highlighted in the selection box. Thereafter, the last visited channel can be stored so that when the user returns to the menu, the menu wheel and panel for the last viewed channel is displayed and highlighted. Several panels of the channels adjacent to the highlighted channel are displayed on the screen. The channel order is preferably maintained during rotation of the wheel, even when rotated out of view. For example, if there are fifty consecutively numbered channels, then channel twenty-six should always be approximately opposite channel one in the simulated wheel of the rotary menu.

Figure 9:
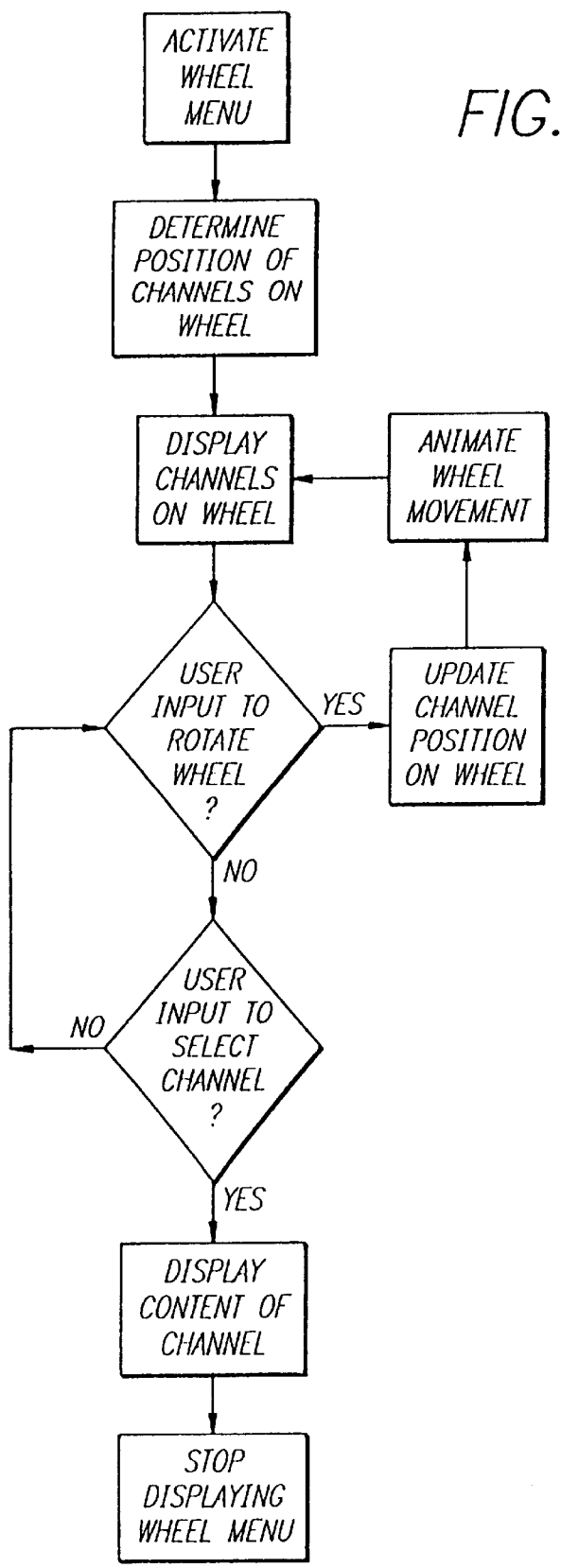
FIG. 9 is a flow chart illustrating the rotary menu wheel for a graphical user interface in accordance with the present invention.

FIG. 9 is a flow chart illustrating a process for implementing the menu wheel for selecting channels of content. The user first activates the wheel menu, and the client determines the position of the channels on the simulated wheel relative to the screen. The channels which would be visible on the front part of the simulated wheel are displayed on the television screen.

If the user selects the command to rotate the menu wheel, the relative channel positions are updated, and the channels are moved vertically to animate the simulated movement of the wheel menu displayed on the television screen. A pointer can be used to track the position of a channel in the circular queue for the wheel. The pointer is updated, either by incrementing or decrementing the pointer in accordance with the user's commands. The movement of the menu wheel is then animated in accordance with the user's commands. As the animation of the menu wheel is completed, the panels are displayed in the new position according to the pointer location in order to smoothly animate the movement of the panels.

If the user has entered a command to select the channel of the highlighted panel, the pointer value is saved, the menu wheel is no, longer displayed, and the content of the selected channel is displayed on the television screen. Another routine can be launched where the selection of the channel requires additional processing, whether web browsing or television signal decoding. For example, where a user selects the guide page, the menu wheel routine is exited and the routine for presenting the dynamic guide page is executed.

The remote control device can also select and scan between the channels representing the television broadcast and internet content through the "up channel" and "down channel" in the remote control device to move back and forth between channels, without first accessing the rotary wheel menu.

The rotary wheel menu is part of a comprehensive interface from which the user can easily access internet content and television programming. The active frame scrolling of the interface actively presents the user with a revolving array of easily understood and identifiable links to web pages containing internet content. The links are presented with associated graphics to represent the subject matter of the linked web page. In presenting a comprehensive interface to the user, that interface should be concise in order to avoid overloading the user with too much information which may not be relevant to the situation.

When accessing e-mail as opposed to browsing web pages, different commands are typically required. Further, when sending, reading, or retrieving e-mail, different commands are available for use. The same toolbar or menu interface is often used for these different e-mail situations, where the unnecessary or inappropriate commands are faded to indicate that they are unavailable to the user. This can lead to confusion by inexperienced users because these faded out commands are often still visible. In one embodiment of the system, a specific dedicated menu for each situation, such as browsing, sending e-mail, reading e-mail, or retrieving e-mail, is made available to the user.

For security of personal information, a password can be required before allowing access to personal e-mail or a web page containing personalized content. A series of graphical icons may be presented to the user, and the user selects a combination of these icons as a personal password.

The television can include hardware commonly referred to as the V-chip which restrict access to channels carrying programming which has been given a certain rating such as TV-14 or TV-M. Internet blocking software is often used as an add-on to browsing software to filter out or restrict access to certain content such as explicit sexual content which would be inappropriate for young children. The criteria used by specific internet blocking software programs can vary. For example, internet blocking software may automatically scan the text of a particular web site and search out for groups of words that would be associated with inappropriate topics, and those pages which use those words are restricted from access by the browser. Another example is a voluntary system developed by the Recreational Software Advisory Committee provides a rating based on the content of a web site and users can block sites with high ratings of undesirable or inappropriate content.

The present system uses a blocking filter which is compatible with one or more of the aforementioned internet blocking software systems and can convert or approximate ratings criteria used in the internet blocking software with that used to rate television programming. The user can set either the internet blocking software or the V-chip in the television to block both types of information or programming. For example, where the user sets the system to block programming with a television rating of TV-14, the browsing software will be modified by the client to block web sites on the internet having comparable content. The client will have a conversion capability to take the criteria used by the blocking software and compare it to predetermined set of criteria for the television rating system. Furthermore, the client can also function as the V-chip for television programming if one is not included in the television set.

A service can be provided through the server, where the server acts as a quality control gatekeeper that presents selected links to web pages. While the user is free to explore outside of the universe developed by the server, less experienced users can explore the more controlled environment provided by the server. The links to other web pages created and maintained by other internet entities and organizations will be preselected or accredited by the service for the quality of their content. After being initially set up, web sites are often not adequately maintained or updated. The staleness of a web site can be a factor in determining the quality of its content.

Unlike an on-line service which creates and provides its own specialized content, the server will provide links to content created by other entities on the internet, wherein those links will be categorized and organized according to the templates. The server, preferably the POP server, acts as the gateway to the linked web pages for the client. The links present in those templates for an individual user will be modified over time based on that user's pattern of usage and the subject matter of the user's browsing.

Figure 10:
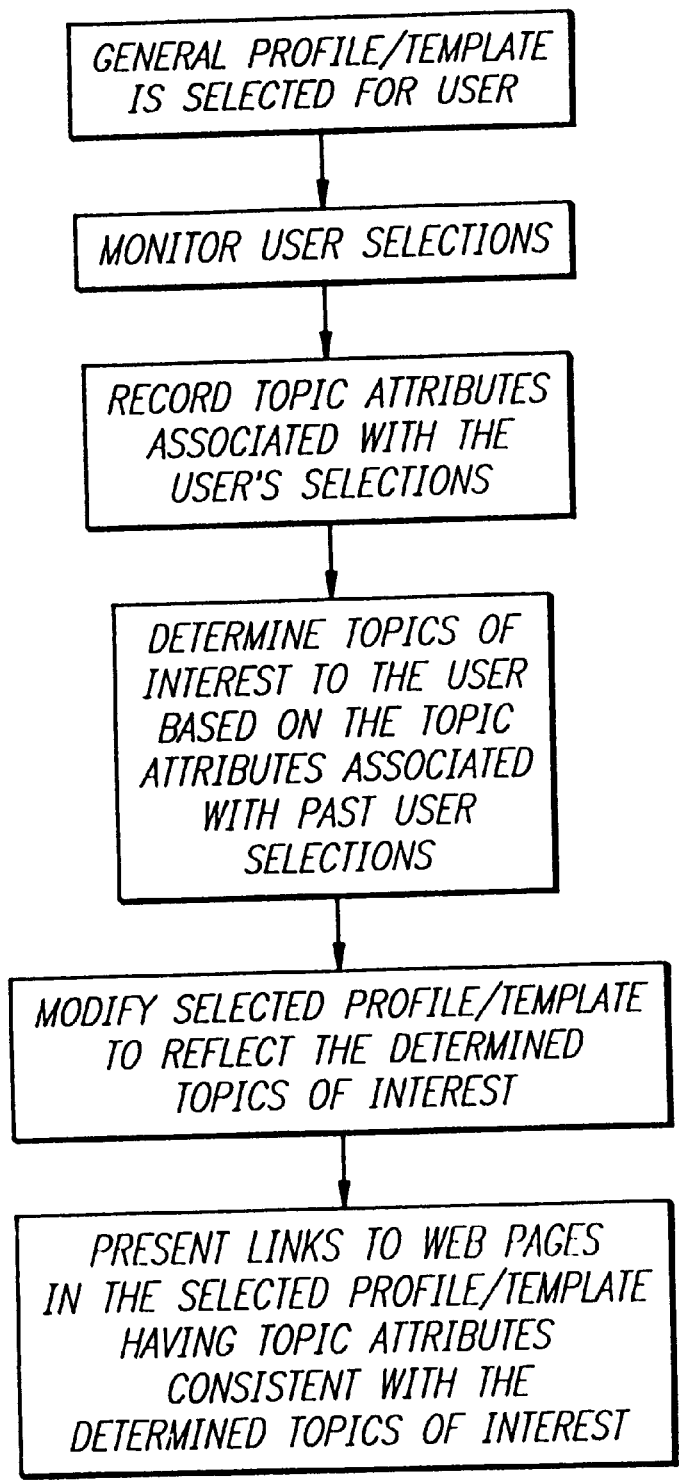
FIG. 10 is a flow chart illustrating the passive filtering for the client-server system in accordance with the present invention.

An intelligent agent on the POP server can monitor the identifying attributes of the preselected linked web pages provided by the server. The intelligent agent can be an anchored agent, and does not need to be a self-contained mobile agent carrying their own state information and moving from server to server. The agent will record the attributes of previously visited web sites from the guide page containing the links provided by the server. The intelligent agent can identify subject areas of interest for the user based on the past viewing and browsing habits of the client user in order to determine the user's preferences for the selected topics provided in the templates. However, the agent does not necessarily rate the quality of the content of the web pages. Instead, as illustrated by the flow chart in FIG. 10, the agent follows a macromanagement approach which presents categories of links according to topics within a template. The topics are defined by attributes which describe subject matter, and the attributes are associated with the linked web pages. The attributes can be attached to a web page link after being reviewed by the service running the POP server, or they can be voluntarily provided by the web site hosting the web page itself, or determined through an algorithm parsing the text of the web page.

Predetermined codes can be provided as part of data transmitted on a television signal to identify the genre of a television program being broadcasted. A television receiver which is capable of monitoring and storing the predetermined genre codes for television programming in order to select programs based on past viewing habits is disclosed in U.S. Pat. No. 5,585,865 ("Amano, et al."), which is hereby incorporated by reference. These genre codes can be consistent with or convertible to the attributes associated with web pages in order to provide additional information to the agent to determine areas of interest for the client user. The client processor can store the genre codes associated with previously viewed television programming, and then provide this data to the agent to augment its web browsing data.

The web pages are classified into the categories or topics of the templates selected by the client user. These attributes associated with the web pages identify aspects of the subject matter or content of the page. FIGS. 3 and 4 illustrate the relationship between the templates and the documents having associated attributes for classification into the topics of the templates. Prescreened web pages having been given identifying attributes can be classified according to those attributes and forced into the topics for the templates. As an example, attribute $\alpha$ may identify the subject of "sports," attribute $\beta$ as "news," and a document or web page having both attributes associated with it would be classed in both topics 1 and 2, and would be displayed as a link in either template I or II. As another example, a web page having attributes $\alpha$, $\Delta$ and $\gamma$ and would be classed as part of topics 1, 3 and 4 in both templates I and II.

While the template and its associated topics may be predetermined, and they can be later adapted automatically by the intelligent agent based on the past viewing and browsing habits of the user. The client or server can record the attributes given for the web pages, and based on these recorded attributes, an algorithm may be used to modify the topics by adding attributes or altering the relationship of the attributes to one another using boolean logic. As an example, topic 1 of template I could be modified to read as attribute $\alpha$ NOT attribute A so that the web page associated with attributes $\alpha$, $\Delta$ and $\gamma$ would not be present in topic 1 of template I. Based on the recorded attributes indicating the user's topical areas of interest, new topics can be modified or generated for the selected templates, or a new personalized template can be generated altogether upon request.

The agent preferably searches through a database of web links which have been compiled by the service to present to the user through the guide page in the graphical user interface. The agent can be focused on the web pages already screened, rated and categorized by the service. The links to web pages can be determined to be suitable by the service based on overall quality considerations, and given identifying attributes either manually or by a word parsing algorithm based on the occurrence of relevant words in the web page.

The guide page presented as part of the graphical user interface can be modified over time. The intelligent agent, located either on the client or server, is capable of automatically modifying, adapting, and updating the guide page based at least in part on past viewing and browsing habits of the user. The guide page is based on a template which organize and categorize the predetermined web links to the user. The filtering by the agent does not search out the entire content of the internet, but only that which has been preselected for inclusion with the templates for the user. Although the templates and associated topics may be initially selected by the user, the agent may modify the topics contained in the templates and filter the preselected contents accordingly for that template.

The agent provides additional links to web pages which have been classified in one or more of the topics set forth in the selected template for the guide page displayed to the client user. Thus, the guide page interface provides an active presentation to the user of the current links currently in the guide page, while updating and revising the links periodically to provide new and current links to the user so that template does not become stale.

In order to present the client user with a more coordinated and faster internet experience more akin to television viewing, the bandwidth capacity of the data connection between the client and server needs to be much greater than that currently available using analog modem connections over existing telephone lines. The bandwidth from all possible and available data connection sources should be utilized for maximum efficiency.

Several different data connection sources may be available to the client, including telephone modems, ISDN lines, digital satellite data services, and cable modems. The client can utilize several different types of data connections simultaneously. Both television and computer data can be multiplexed and provided to the client over the same digital satellite connection. For example, the client can utilize both a telephone modem and a digital satellite service, where the satellite service provides both traditional television programming, as well as internet content in the blanking signal of the television programming or otherwise incorporated into the digital data stream. Content which is personalized could be received by the telephone line, while the satellite connection is used to receive information of broader appeal which is selectively received by a filtering mechanism in the client.

A digital satellite service separate from a DBS for television programming can download digital computer data at a rate of about 400 Kbps. However, such a service could be expensive, with additional connect fees based on each megabyte of data downloaded. However, by using an analog modem to download text which does not require a large bandwidth for rapid downloading, some download connect fees can be avoided. Text for other linked web pages can be downloaded over the modem connection while he user is reading or viewing another page containing the links. Either the client or the server can automatically initiate downloading at off-peak hours as previously discussed in order to efficiently use the available data connections to download data to the client for access by the user. The standard modem connection can also be used to download text and other data to update current links and associated objects or content while the user is on-line and browsing, but not actively downloading documents, so as to utilize the modem connection which would otherwise remain idle.

Figure 11:
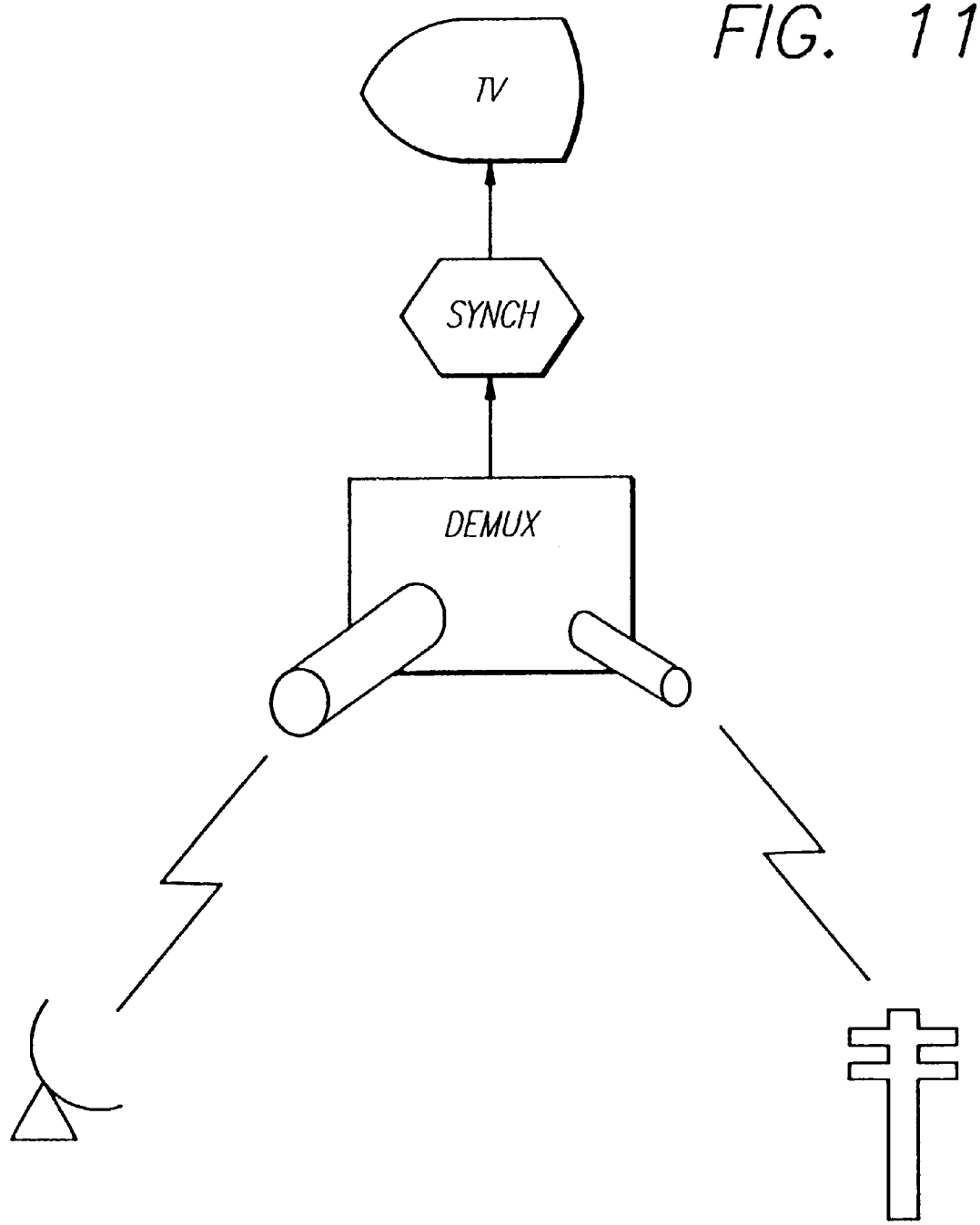
FIG. 11 is a block diagram illustrating the multiple data streams for the client-server system in accordance with the present invention.

As shown in FIG. 11, the client is capable of demultiplexing data from both pipelines, where graphics, sound, and video files are preferably downloaded over the larger and faster pipeline having more bandwidth such as a digital satellite connection. Less bandwidth-demanding text and data files can be provided over the modem connection in order to efficiently use of all available bandwidth sources. Data files provided over the modem connection can be used to indicate which files are being transferred over which data connection, and to coordinate the presentation of the data being provided over the larger bandwidth. For example, different text, sound and animation files may be coordinated to produce a dynamic sideshow presentation to the user.

Figure 12:
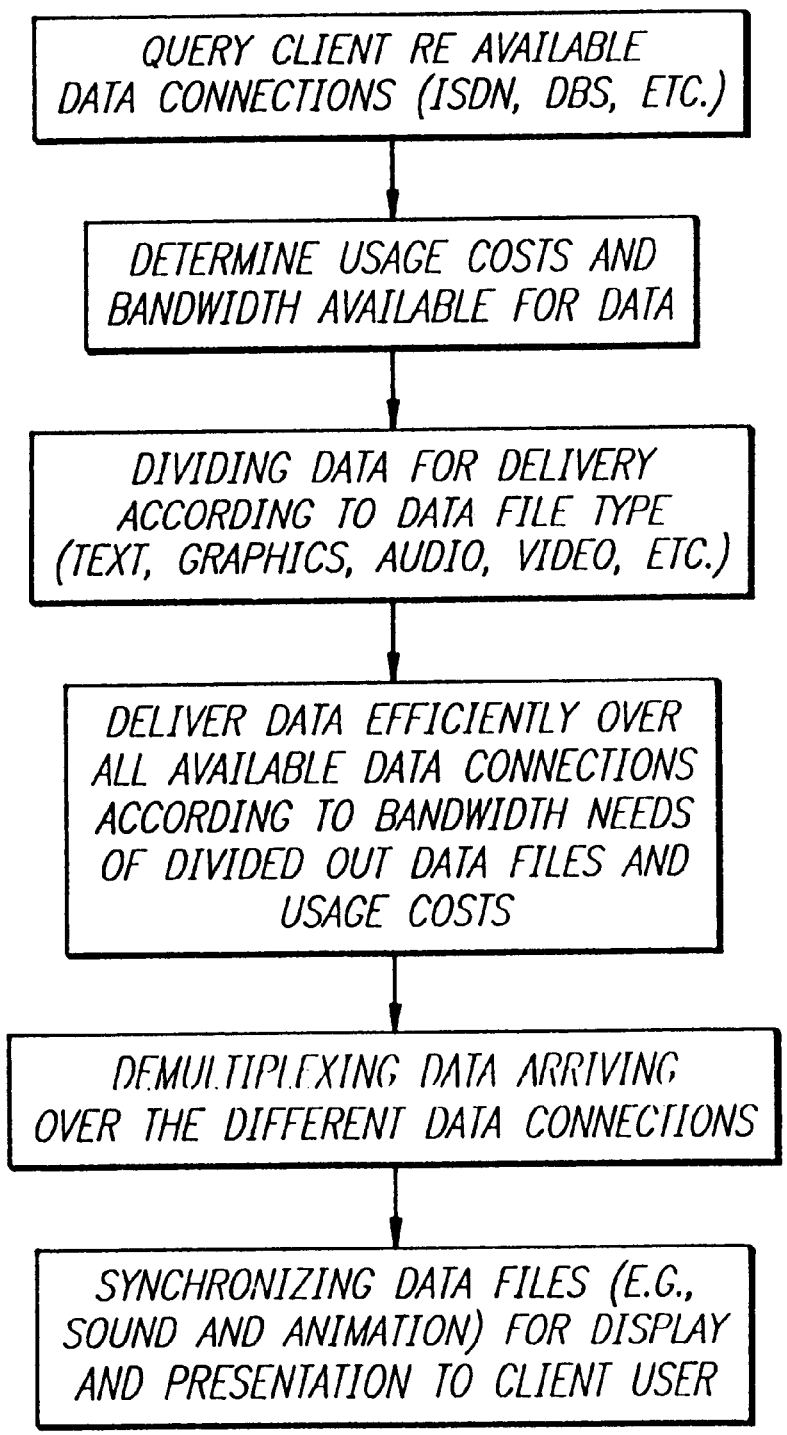
FIG. 12 is a flow chart illustrating the processing of multiple data streams by the client in accordance with the present invention.

When establishing a remote data connection, the server and client initially perform a handshake to establish communication protocols. The server can further query the client regarding its available data stream connections, including telephone modems, cable modems, and digital satellite broadcasting, as illustrated in FIG. 12, in order to determine the most efficient delivery of different types of data through all of the available bandwidth connections. Different types of data files can be divided from one another and the data files delivered over the different data connection depending on the type of data file being transferred, the size of such files, and the bandwidth available for the different data connections. Data arriving over the different data connections are demultiplexed by the client. The efficient delivery of data allows the client to present text, graphics, video, audio and other multimedia information from a web page over the internet as a fast and coordinated presentation. A closer working relationship can also be developed as a result of the querying between the server and the client in order to develop a more efficient allocation of processing and storage burdens and responsibilities between the client and the server. Clients with limited storage capacity can utilize space on the server for certain functions.

Data is often compressed for more rapid delivery over the limited bandwidth currently available. Different types of data files, such as sound, video and graphics files, are often compressed at different rates and ratios, often using different compression schemes. For example, video data can be compressed using the MPEG1 or MPEG2 standards, audio data as wav, au or aiff files, and graphic images can be compressed using either the JPEG or GIF standards. Such data may be decompressed at different rates, and the client may include specific hardware or software, or a combination of both, to properly synchronize the decompression of data for a document or file for simultaneous and coordinated presentation to the user of, for example, different combinations of sound and animation files. Different selected sound and animation files can be mixed and matched, and used together for different occasions, and can be synchronized for a coordinated presentation to the client user.

From the foregoing it will be appreciated that the system of the present invention provides advantages in presenting information in a simple, intuitive manner, while making the most efficient use of the available bandwidth source connections. While several particular forms of the invention have been illustrated and described, it will be apparent that various modifications can be made without departing from the spirit and scope of the invention. Accordingly, the invention is not to be limited, except as by the following claims.

What is claimed:

1. A system for selectively displaying internet content and television programming on a display, the system comprising:

a client, including a display, and channels separately representing individual television intent and individual internet content;

means for selecting between the channels, wherein when an individual television content channel or an individual internet content channel is selected the client presents the content associated with the selected channel on the display;

means for presenting on the display an internet gateway interface which selectively scrolls through links to selected web pages organized according to templates corresponding to web page content displayed on internet content channels; and a server, including means for establishing a data connection with the client and downloading data along the data connection to the client;

a menu for providing a single uniform interface to enable the user to navigate among the channels of internet sites and television stations, wherein the menu comprises a rotary wheel menu, comprising a series of panels which appear to occupy three-dimensional space including extending behind the television screen, wherein the panels on the front side of the rotary wheel menu can be viewed on the television screen wherein the distance between adjacent panels decreases and eventually overlaps towards the zenith and nadir of the rotary wheel, whereby the extreme panels displayed on the screen appear to move behind other displayed panels.

2. A system for selectively displaying internet content and television programming on a display, the system comprising:

a client, including a display, and channels separately representing individual television content and individual internet content;

means for selecting between the channels, wherein when an individual television content channel or an individual internet content channel is selected the client presents the content associated with the selected channel on the display, comprising a rotary wheel menu for enabling the user to select a channel, wherein the rotary wheel menu comprises a series of panels which appear to occupy three-dimensional space including extending behind the television screen, wherein the panels on the front side of the rotary wheel menu can be viewed on the television screen, wherein the distance between adjacent panels decreases and eventually overlaps towards the zenith and nadir of the rotary wheel, whereby the extreme panels displayed on the screen appear to move behind other displayed panels;

means for presenting on the display an internet gateway interface which selectively scrolls through links to selected web pages organized according to templates corresponding to web page content displayed on internet content channels; and a server, including means for establishing a data connection with the client and downloading data along the data connection to the client.

\* \* \* \* \*